(12) United States Patent
Kray et al.

(10) Patent No.: US 12,291,974 B2
(45) Date of Patent: May 6, 2025

(54) TURBINE ENGINE HAVING AN AIRFOIL ASSEMBLY WITH A TRUNNION AND A SPAR

(71) Applicants: General Electric Company, Schenectady, NY (US); GE Marmara Technology Center Muhendislik Hizmetleri Ltd, Gebze (TR)

(72) Inventors: Nicholas Joseph Kray, Mason, OH (US); Nicholas Mark Daggett, Camden, ME (US); Elzbieta Kryj-Kos, Liberty Township, OH (US); Necip Adali, Istanbul (TR); Benjamin Thomas Van Oflen, Cincinnati, OH (US); Gary Willard Bryant, Jr., Loveland, OH (US); Douglas Lorrimer Armstrong, Needham, MA (US)

(73) Assignees: General Electric Company, Evandale, OH (US); GE Marmara Technology Center Muhendislik Hizmetleri Ltd, Gebze (TR)

( * ) Notice: Subject to any disclaimer, the term of this patent is extended or adjusted under 35 U.S.C. 154(b) by 0 days.

(21) Appl. No.: 18/318,950

(22) Filed: May 17, 2023

(65) Prior Publication Data
US 2024/0384657 A1  Nov. 21, 2024

(51) Int. Cl.
*F01D 5/14* (2006.01)

(52) U.S. Cl.
CPC .......... *F01D 5/147* (2013.01); *F05D 2220/36* (2013.01); *F05D 2240/30* (2013.01)

(58) Field of Classification Search
CPC .......... F01D 5/30; F01D 5/3023; F01D 5/3092
See application file for complete search history.

(56) References Cited

U.S. PATENT DOCUMENTS

| | | | |
|---|---|---|---|
| 2,686,655 A | 8/1954 | Schorner | |
| 3,392,789 A | 7/1968 | Wiberg | |
| 3,695,777 A * | 10/1972 | Westphal | F01D 17/162 |
| | | | 415/208.1 |
| 3,753,326 A | 8/1973 | Kaufman, Sr. | |
| 4,031,601 A | 6/1977 | Staub et al. | |
| 4,335,998 A | 6/1982 | Siebels | |
| 4,417,854 A | 11/1983 | Cain et al. | |
| 4,706,354 A * | 11/1987 | Naudet | F01D 17/162 |
| | | | 29/445 |
| 4,884,948 A | 12/1989 | Sikorski | |
| 5,022,825 A | 6/1991 | Violette | |

(Continued)

FOREIGN PATENT DOCUMENTS

| | | |
|---|---|---|
| EP | 0109814 B1 | 2/1988 |
| EP | 2469028 B1 | 12/2016 |

(Continued)

*Primary Examiner* — Woody A Lee, Jr.
*Assistant Examiner* — Cameron A Corday
(74) *Attorney, Agent, or Firm* — McGarry Bair PC

(57) ABSTRACT

A turbine engine including a fan section, a compressor section, a combustion section, a turbine section, and an airfoil assembly. The airfoil assembly comprising a spar, a trunnion and a stress relief. The trunnion having an upper edge with an open top, and a socket extending from the open top. The spar extending through the open top and into the socket. A junction being formed between the spar and a portion of the upper edge defining the open top.

20 Claims, 9 Drawing Sheets

(56) References Cited

U.S. PATENT DOCUMENTS

| | | | |
|---|---|---|---|
| 5,374,145 A * | 12/1994 | Mairesse | F04D 29/323 |
| | | | 411/60.1 |
| 5,573,377 A | 11/1996 | Bond et al. | |
| 5,720,597 A | 2/1998 | Wang et al. | |
| 6,039,542 A | 3/2000 | Schilling et al. | |
| 6,287,080 B1 | 9/2001 | Evans et al. | |
| 6,290,466 B1 | 9/2001 | Ravenhall et al. | |
| 8,105,042 B2 | 1/2012 | Parkin et al. | |
| 8,419,374 B2 | 4/2013 | Huth et al. | |
| 8,573,947 B2 | 11/2013 | Klinetob et al. | |
| 8,696,319 B2 | 4/2014 | Naik | |
| 9,004,873 B2 | 4/2015 | Rice | |
| 9,359,901 B2 | 6/2016 | Evans et al. | |
| 9,429,024 B2 | 8/2016 | Nagle et al. | |
| 9,453,421 B2 | 9/2016 | Cairo et al. | |
| 9,488,059 B2 | 11/2016 | Ventura et al. | |
| 9,828,864 B2 | 11/2017 | Whitehurst et al. | |
| 10,125,620 B2 | 11/2018 | Alvanos | |
| 10,280,769 B2 | 5/2019 | Cook et al. | |
| 10,472,978 B2 | 11/2019 | Whurr | |
| 10,487,667 B2 | 11/2019 | Slavens et al. | |
| 10,563,522 B2 | 2/2020 | Thomas et al. | |
| 10,753,371 B2 * | 8/2020 | Sebrecht | F04D 29/644 |
| 11,346,363 B2 | 5/2022 | Foster et al. | |
| 11,846,192 B1 * | 12/2023 | Xie | F01D 5/32 |
| 11,993,365 B2 | 5/2024 | Cottet | |
| 2005/0084190 A1 * | 4/2005 | Brooks | F01D 17/162 |
| | | | 384/276 |
| 2007/0059161 A1 * | 3/2007 | Bouru | F16C 17/10 |
| | | | 415/160 |
| 2014/0322025 A1 | 10/2014 | Barnhart et al. | |
| 2016/0376919 A1 * | 12/2016 | Miller | F04D 29/323 |
| | | | 416/220 R |
| 2017/0313404 A1 | 11/2017 | Colmagro | |
| 2019/0242399 A1 | 8/2019 | Kray et al. | |
| 2020/0386108 A1 * | 12/2020 | Stoyanov | F01D 9/041 |
| 2022/0065118 A1 | 3/2022 | Kray | |

FOREIGN PATENT DOCUMENTS

| | | |
|---|---|---|
| EP | 3179085 B1 | 7/2018 |
| EP | 2568116 B1 | 3/2019 |
| GB | 1104812 A | 2/1968 |
| WO | 2015002976 A1 | 1/2015 |
| WO | 2022018359 A1 | 1/2022 |

* cited by examiner

TURBINE ENGINE HAVING AN AIRFOIL ASSEMBLY WITH A TRUNNION AND A SPAR

TECHNICAL FIELD

The disclosure generally relates to turbine engine having an airfoil assembly, and more specifically to an airfoil assembly having a spar and a trunnion.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

In some turbine engines, a variable pitch airfoil can be included, which can be selectively rotated to adjust or otherwise tailor the flow of fluid over the variable pitch airfoil. The variable pitch airfoil is movable through use of a trunnion and a spar. The trunnion can rotate about a rotational axis, which in turn rotates the spar and the variable pitch airfoil. The trunnion is coupled to or otherwise formed with the spar.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
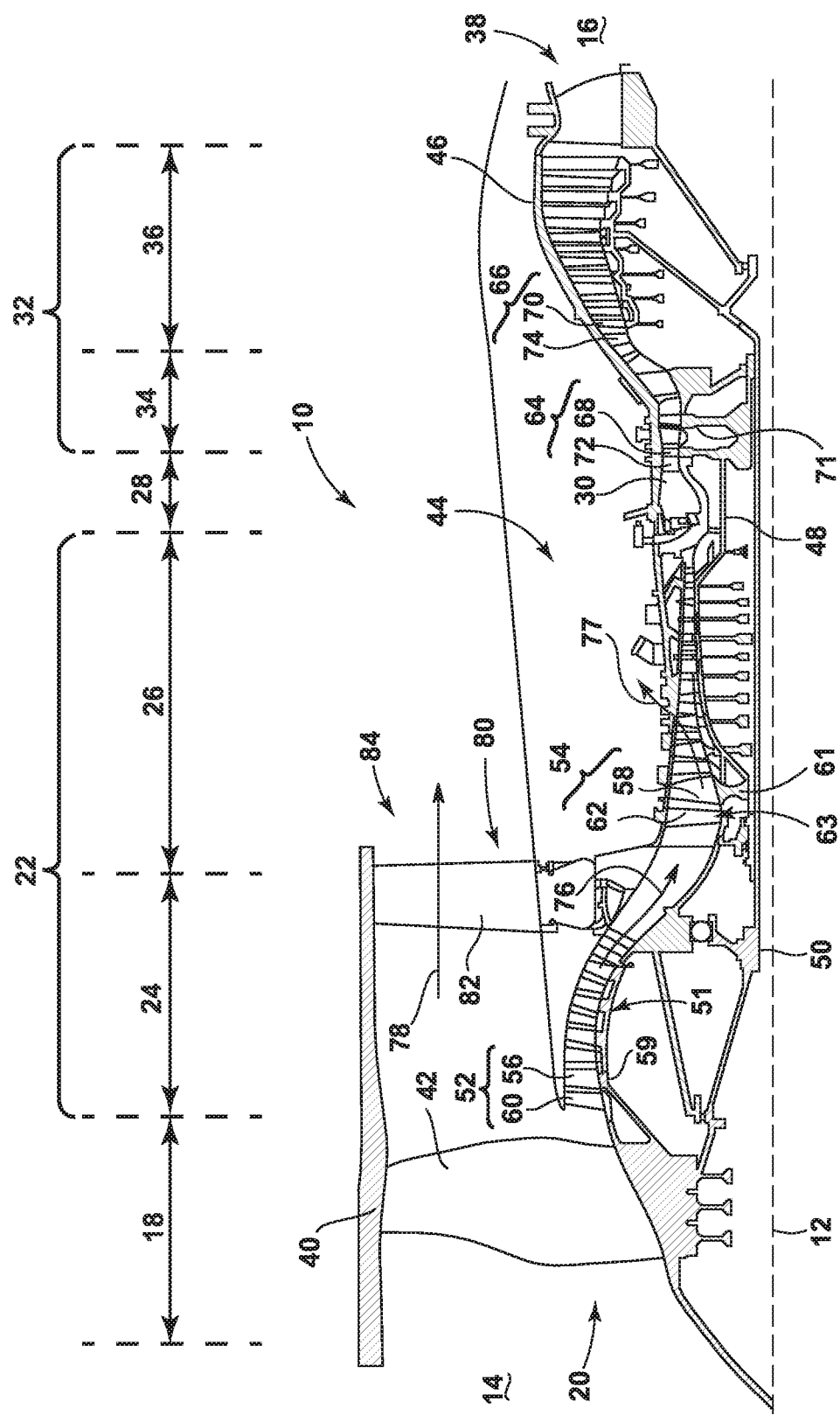
FIG. 1 is a schematic cross-sectional view of a turbine engine in accordance with an exemplary embodiment of the present disclosure.

Aspects of the disclosure herein are directed to an airfoil assembly for a turbine engine. The airfoil assembly includes an airfoil, a spar, and a trunnion. The spar couples the airfoil to the trunnion. The trunnion includes an upper edge with an open top. The spar and the upper edge meet at a junction. A stress relief is provided at least at the junction.

The stress relief is used to distribute a stress along a portion of the spar associated with the movement of the spar against the trunnion. For purposes of illustration, the present disclosure will be described with respect to an airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30. The bleed air 77 can also be utilized by other systems.

A remaining portion of the airflow, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
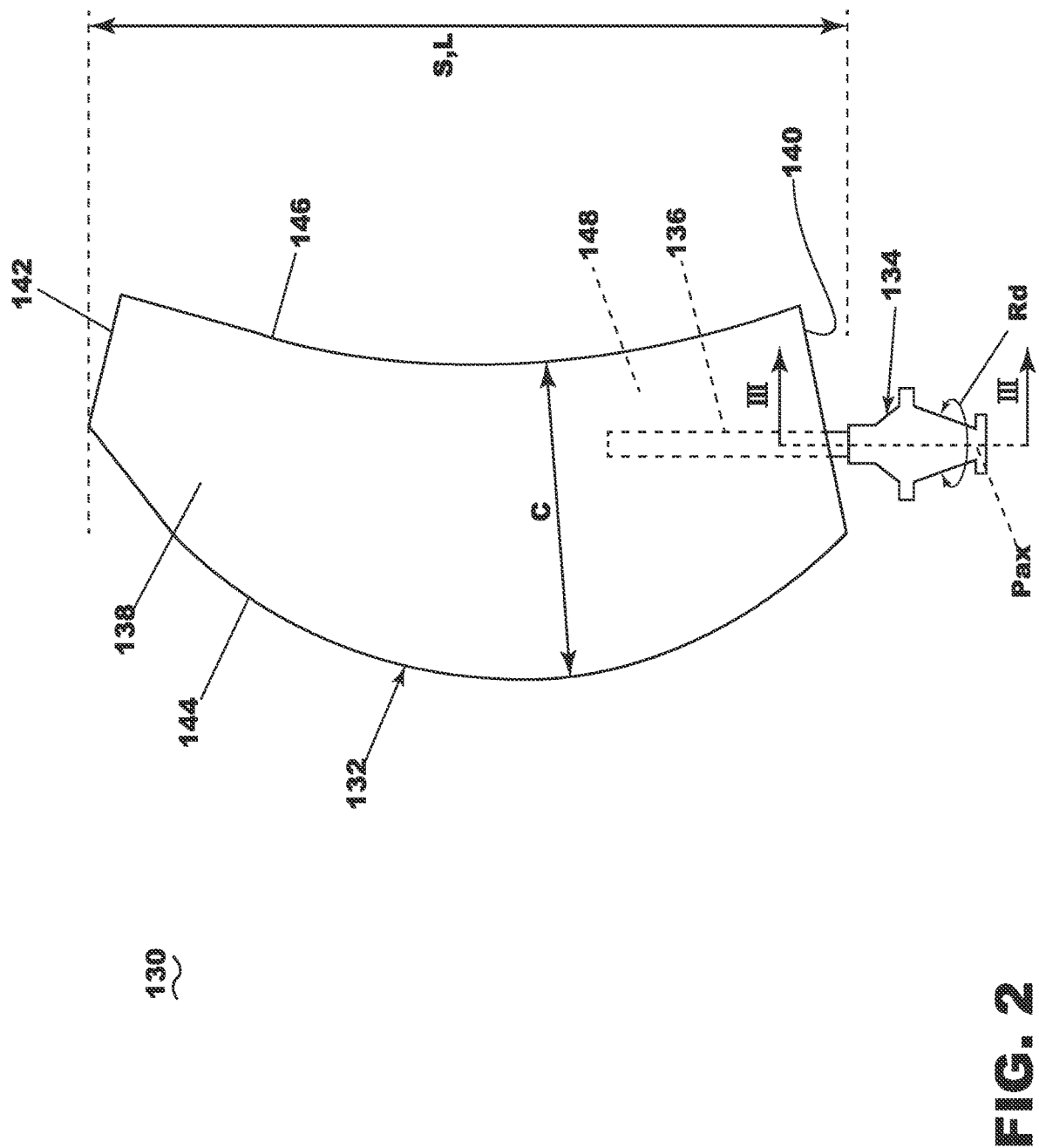
FIG. 2 is a schematic illustration of an airfoil assembly suitable for use within the turbine engine of FIG. 1, the airfoil assembly including an airfoil, a trunnion, and a spar.

FIG. 2 is schematic illustration of an airfoil assembly 130 suitable for use within the turbine engine 10 of FIG. 1. The airfoil assembly 130 can include an airfoil 132 that is any suitable airfoil of the turbine engine 10. As a non-limiting example, the airfoil 132 can be a blade of the plurality of fan blades 42, or a blade from the compressor blades 56, 58 or the turbine blades 68, 70. It is contemplated that the airfoil 132 can be a blade, vane, airfoil, or other component of any turbine engine, such as, but not limited to, a gas turbine engine, a turboprop engine, a turboshaft engine, a ducted turbofan engine, an unducted turbofan engine or an open rotor turbine engine.

The airfoil 132 can include a wall 138 bounding an interior 148. The outer wall 138 can extend between a leading edge 144 and a trailing edge 146 to define a chordwise direction (C). The outer wall 138 can further extend between a root 140 and a tip 142 to define a spanwise direction (S). The outer wall 138 can be a composite wall made of one or more layers of composite material. The one or more layers of material can be applied during the same stage or different stages of the manufacturing of the airfoil 132.

By way of non-limiting example, wall 138 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The airfoil assembly 130 can further include a spar 136 and a trunnion 134. The spar 136 can extend into the interior 148. The spar 136 can extend from the root 140. The spar 136 can be operably coupled to the trunnion 134. The spar 136 can be any suitable material such as, but not limited to, a composite material. The spar 136 can be a metal composite. The trunnion 134 can include any suitable material such as, but no limited to, a metallic material or a composite material. It will be appreciated that the term composite material can further include metals but with a composite architecture (e.g., a metal matrix composite). In the case of a composite material, the spar 136 and/or the trunnion 134 can be any suitable composite material such as a 2D or 3D composite, a laminate skin, a woven or a braided composite, or any other suitable composite.

The airfoil 132 has a span length (L) measured along the spanwise direction S from the root 140 at 0% the span length (L) to the tip 142 at 100% the span length (L). An entirety of the spar 136 can be located below 20% of the span length (L). Alternatively, the spar 136 can extend past 20% of the span length (L).

During operation of the airfoil assembly 130, the trunnion 134 can rotate about a pitch axis (Pax) in a rotational direction (Rd). As the spar 136 couples the trunnion 134 to the airfoil 132, rotation of the trunnion 134 in the rotational direction (Rd) causes the airfoil 132 to rotate about the pitch axis (Pax). This rotation can be used to control the pitch of the airfoil assembly 130 such that the airfoil assembly 130 is defined as a variable pitch airfoil assembly. The pitch of the airfoil assembly 130 can be varied based on the operation or intended operation of the turbine engine (e.g., the turbine engine 10 of FIG. 1) that the airfoil assembly 130 is provided on.

Figure 3:
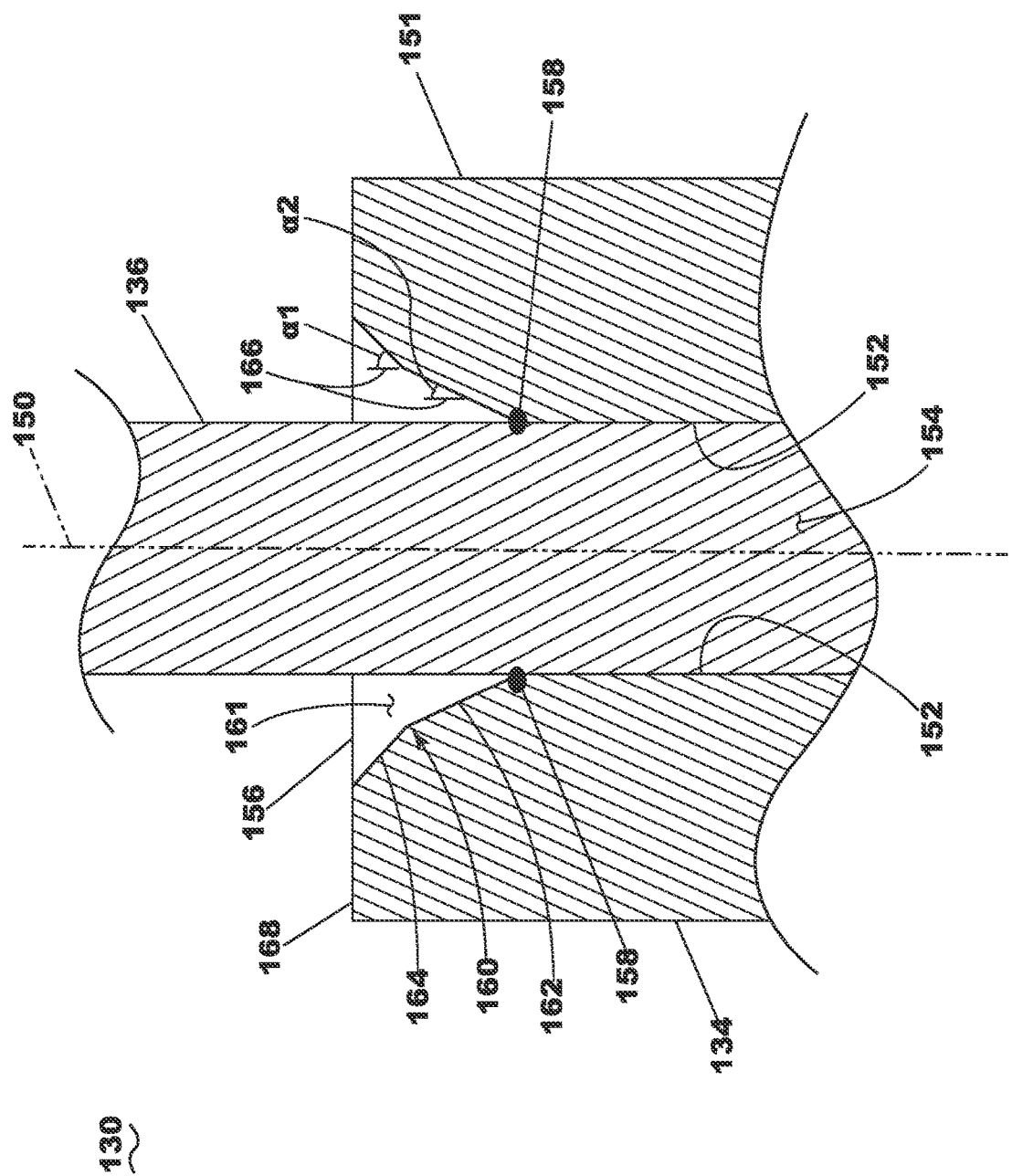
FIG. 3 is a schematic cross-sectional view of a portion of the airfoil assembly as seen from sectional line III-III of FIG. 2, further illustrating a stress relief including a groove located along a junction between the spar and the trunnion.

FIG. 3 is a schematic cross-sectional view of a portion of the airfoil assembly 130 as seen from sectional line III-III of FIG. 2. The airfoil 132 (FIG. 2) is removed from the airfoil assembly 130 for illustrative purposes.

The trunnion 134 includes a wall 151 with a set of interior surfaces 152 that at least partially define a socket 154. The trunnion 134 includes an upper edge 168 having an open top 156 opening to the socket 154. The upper edge 168 is defined as a continuous surface of the trunnion that defies an upper distal end of the trunnion 134. At least a portion of the upper edge 168 can confront the airfoil 132 (FIG. 2) when the spar 136 is received within the interior 148 (FIG. 2) of the airfoil 132.

The spar 136 extends along a centerline axis 150. The spar 136 extends through the open top 156 and into a portion of the socket 154. As illustrated, the spar 136 is received within the socket 154. It will be appreciated that if the spar 136 were removed from the socket 154, the socket 154 would define a void formed within the trunnion 134.

The spar 136 contacts a portion of the upper edge 168 at a junction 158. The junction 158 can be provided around at least a portion of a perimeter of the open top 156. As a non-limiting example, the spar 136 can contact the upper edge 168 about an entirety of the perimeter of the open top 156 such that the junction 158 is formed about an entirety of the spar 136.

A stress relief 160 can be provided along a portion of the upper edge 168 and further define at least a portion of the upper edge 168. At least a portion of the stress relief 160 can be provided or located at the junction 158. The stress relief 160 can be coupled to or integrally formed with the trunnion 134. In some instances, the stress relief 160 can be machined into the trunnion 134. The stress relief 160 can extend circumferentially continuously or in segments about the centerline axis 150. As a non-limiting example, the airfoil assembly 130 can include multiple stress reliefs 160 that are circumferentially spaced about the centerline axis 150. As a non-limiting example, there can be a single stress relief 160 extending circumferentially about less than an entirety of the centerline axis 150.

The stress relief 160 can take any suitable shape. As a non-limiting example, the stress relief 160 can include a groove 161. The groove 161 can be provided along a portion of the upper edge 168. The groove 161 can open up to the socket 154 such that the groove 161 defines a portion of the socket 154. In other words, the groove 161 can be formed along a portion of the trunnion 134 that confronts the spar 136.

The groove 161 can be defined by a set of legs. As a non-limiting example, the groove 161 can be defined by a first leg 162 and a second leg 164 of the stress relief 160. The first leg 162 and the second leg 164 each define respective portions of the upper edge 168. The first leg 162 can extend between the junction 158 and the second leg 164. While shown as the first leg 162 transitioning straight into the second leg 164, it will be appreciated that a rounded contour or fillet can be provided between the first leg 162 and the second leg 164.

The first leg 162 is non-parallel to the second leg 164. The first leg 162 can extend at a first angle ($\alpha 1$) with respect to a projection 166 of the centerline axis 150. The second leg 164 can extend at a second angle ($\alpha 2$) with respect to the projection 166. The first angle ($\alpha 1$) can be smaller than the second angle ($\alpha 2$). The first angle ($\alpha 1$) can have an absolute value of greater than or equal to 0.1 degrees and less than or equal to 10 degrees. The second angle ($\alpha 2$) can have an absolute value of greater than or equal to 0.1 degrees and less than or equal to 15 degrees.

While two legs are illustrated, it will be appreciated that the groove 161 can include any number of one or more legs. It will be appreciated that each leg of the set of legs can extend at a differing angle. As a non-limiting example, the angle of a leg intersecting the junction 158 can be the smallest while a last leg, defined as a leg axially farthest from the leg intersecting the junction 158, can be the largest. As a non-limiting example, the angles can progressively increase from the leg intersecting the junction 158 to the leg axially farthest from the junction 158. The set of legs that define that groove 161 can extend linearly or non-linearly. In the case of a leg that extends non-linearly, the angle is defined at the vertex between the leg and an adjacent leg. The set of legs can extend any suitable distance. As such, the groove 161 can be any suitable size or shape.

Figure 4:
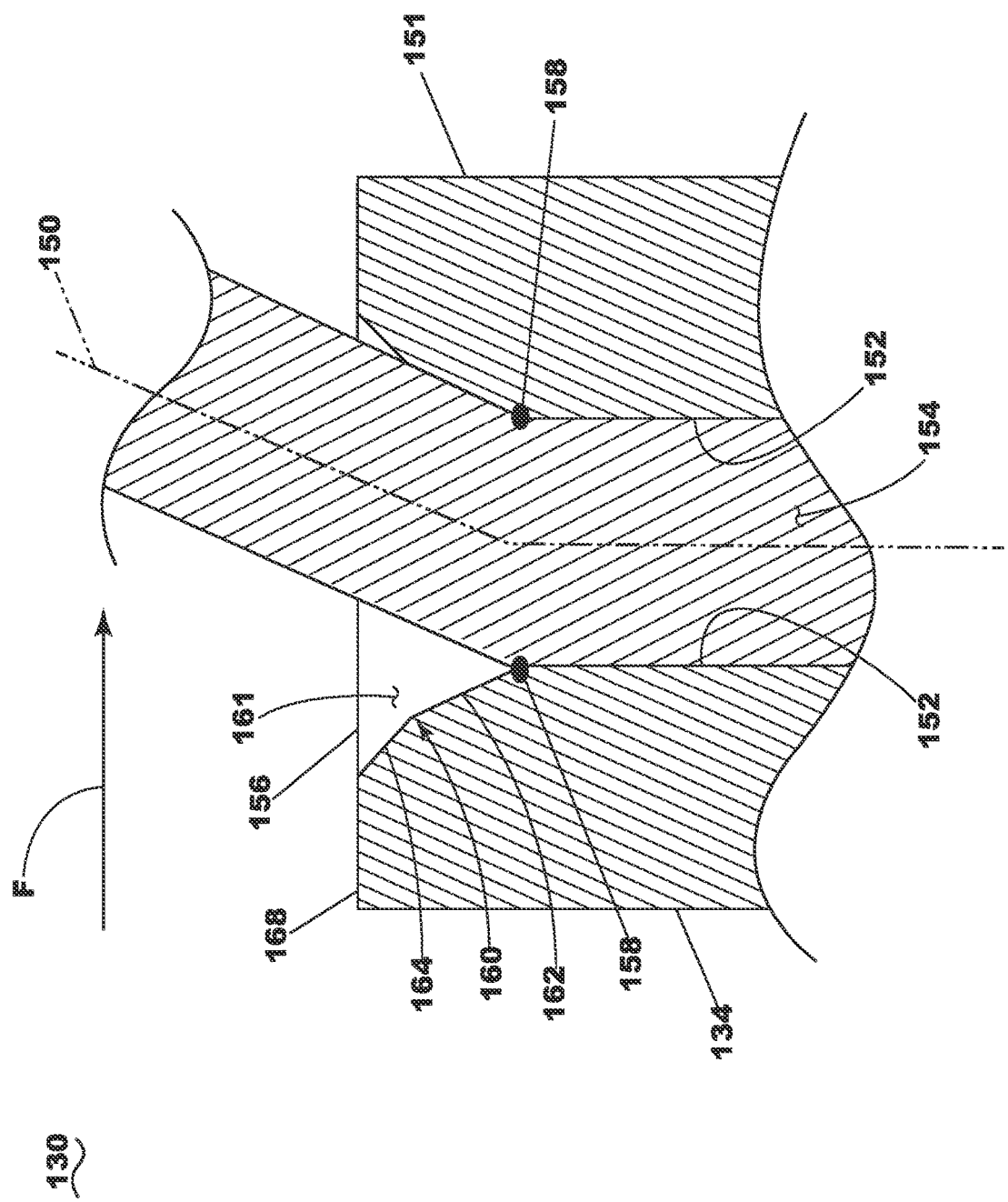
FIG. 4 is a schematic cross-sectional view of the airfoil assembly of FIG. 3, further illustrating a bending of the spar due to an external force.

FIG. 4 is a schematic cross-sectional view of the airfoil assembly 130 of FIG. 3. During operation of the airfoil assembly 130 or the turbine engine 10 (FIG. 1), an external force (F) can be applied to a portion of the spar 136. The external force (F) can be any suitable force such as, but not limited to, an aero load or rotational forces associated with the rotation of the airfoil assembly 130.

The external force (F) can cause the spar 136 to move, bend or flex against a portion of the trunnion 134 and pivot about a respective portion of the junction 158. The stress relief 160 is sized and positioned to limit the stresses associated with the spar 136 contacting the trunnion 134 due to the external force (F). As a non-limiting example, the spar 136 can come into contact with a portion of the first leg 162 and extend along a portion of the first leg 162. In some instances, the spar 136 can come into contact with and extend along a portion of the second leg 164 or any other subsequent leg. It is contemplated that use of the set of legs of the stress relief 160 can distribute the stresses along a greater region of the spar 136 when compared to a trunnion 134 without the stress relief 160. The stress relief 160 can therefore effectively tailor the stiffness of the spar 136.

Without the stress relief 160, the spar 136 would pivot about the junction 158 and a point stress would be experienced along the spar 136 at the junction 158. This point stress can damage the spar 136 as the point stress is a relatively large concentration of stresses. The stress relief 160, however, eliminates the point stress at the junction 158 and instead distributes the stresses along the spar 136 that would otherwise form the point stress.

It is contemplated that the stress relief 160 can be formed on a single side of the trunnion 134. As a non-limiting example, the stress relief 160 can be formed on a side of the trunnion 134 that the external force (F) is expected to cause the spar 136 to move towards. As a non-limiting example, the external force (F) can be a rotational force caused by the movement or operation of the airfoil assembly 130. The stress relief 160 can be provided on a side of the trunnion corresponding to an opposing circumferential direction that the airfoil assembly 130 rotates in.

Figure 5:
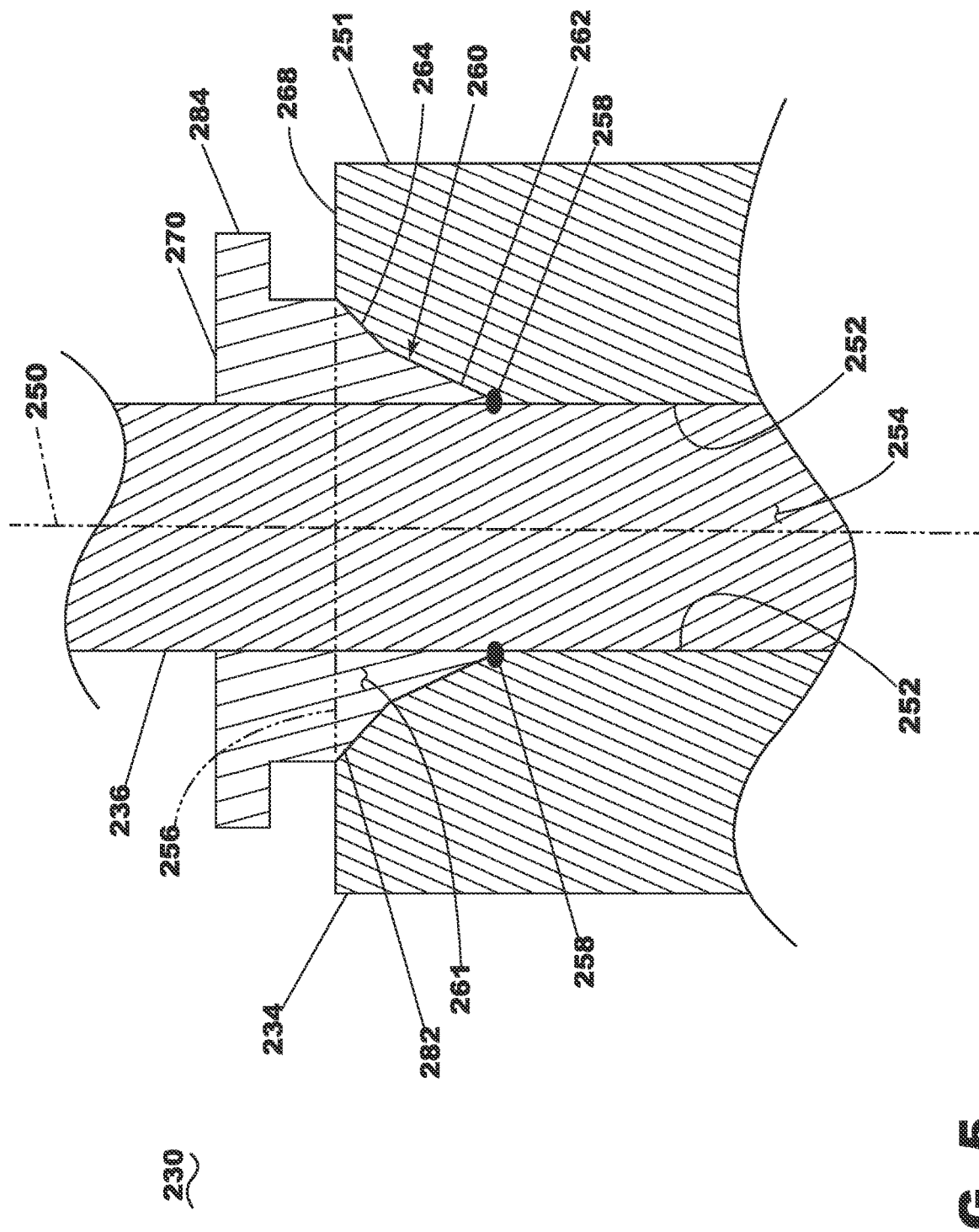
FIG. 5 is a schematic cross-sectional view of a portion of an exemplary airfoil assembly suitable for use as the airfoil assembly of FIG. 2, the airfoil assembly comprising a stress relief including a groove and an insert.

FIG. 5 is a schematic cross-sectional view of a portion of an exemplary airfoil assembly 230 suitable for use as the airfoil assembly 130 of FIG. 2. The airfoil assembly 230 is similar to the airfoil assembly 130 (FIGS. 3 and 4), therefore, like parts will be identified with like numerals increased to the 200 series, with it being understood that the description of the airfoil assembly 130 applies to the airfoil assembly 230 unless noted otherwise.

The airfoil assembly 230 includes a trunnion 234 and a spar 236. The trunnion 234 includes a wall 251 having a set of interior surfaces 252 defining a socket 254. The trunnion 234 includes an upper edge 268 with an open top 256. The open top 256 opens to the socket 254. The spar 236 extends along a centerline axis 250. The spar 236 extends through the open top 256 and into the socket 254. The spar 236 contacts the upper edge 268 at a junction 258.

The airfoil assembly 230, like the airfoil assembly 130, includes a stress relief 260 formed at the junction 258. The stress relief 260 includes a groove 261. The groove 261 can be defined by a first leg 262 and a second leg 264, non-parallel to the first leg 262. The stress relief 260, however, further comprises an insert 270 at least partially receivable within the groove 261.

The insert 270 can extend from the groove 261 and along a portion of the spar 236. The insert 270 can be any suitable insert. As a non-limiting example, the insert 270 can include a foot 282 and a collar 284 such that the insert 270 is formed as a bushing. The foot 282 can be sized to be received within the groove 261. The collar 284 can extend radially outwardly from the spar 236.

The insert 270 can be made of any suitable material. As a non-limiting example, the insert 270 can include a composite material. As a non-limiting example, the insert 270 can include a composite material that is the same or different as the material of at least one of the spar 236 or the trunnion 234.

When assembled, the insert 270 can be at least partially provided within a flow path of air that flows around the airfoil (e.g., the airfoil 132 of FIG. 2). As a non-limiting example, the insert 270 can extend from the root (e.g., the root 140 of FIG. 2) or be provided radially near the root of the airfoil of the airfoil assembly 230.

It is contemplated that the insert 270 can be used to further tailor the stiffness of the airfoil assembly 230. In comparison to the airfoil assembly 130 of FIGS. 2-4, the airfoil assembly 230 will be stiffer and reduce local deflection of the spar 236. The insert 270 can further be defined as a damper that slows down and limits the flexing or bending of the spar 236. The insert 270 can further be used to form a seal between the socket 254 and a fluid exterior the socket 254. In other words, the insert 270 can prevent a fluid from entering or exiting the socket 254 through the open top 256.

Figure 6:
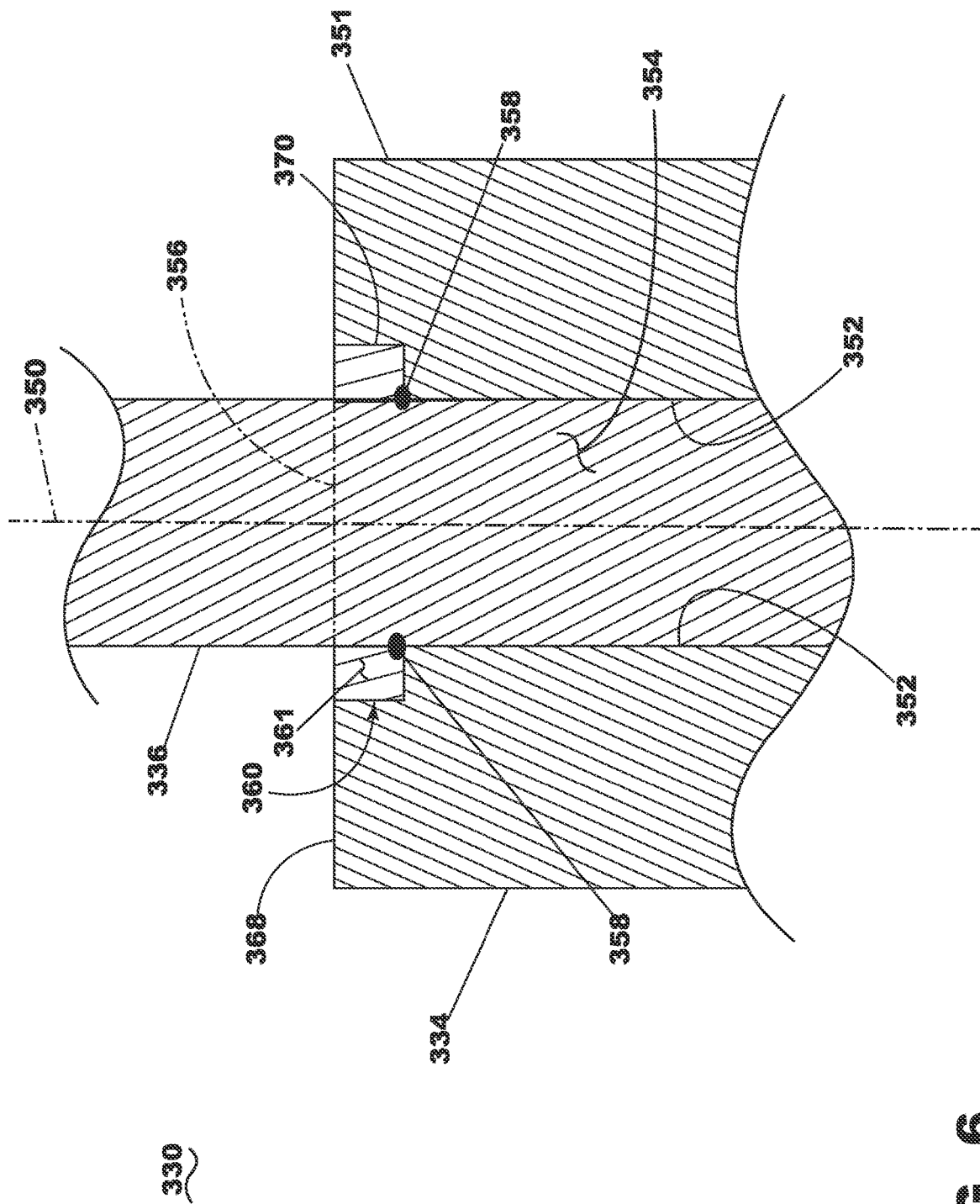
FIG. 6 is a schematic cross-sectional view of a portion of an exemplary airfoil assembly suitable for use as the airfoil assembly of FIG. 2, the airfoil assembly comprising a stress relief including a groove and a compressible insert.

FIG. 6 is a schematic cross-sectional view of a portion of an exemplary airfoil assembly 330 suitable for use as the airfoil assembly 130 of FIG. 2. The airfoil assembly 330 is similar to the airfoil assemblies 130 (FIGS. 3 and 4), 230 (FIG. 5), therefore, like parts will be identified with like numerals increased to the 300 series, with it being understood that the description of the airfoil assembly 130, 230 applies to the airfoil assembly 330 unless noted otherwise.

The airfoil assembly 330 includes a trunnion 334 and a spar 336. The trunnion 334 includes a wall 351 having a set of interior surfaces 352 defining a socket 354. The trunnion 334 includes an upper edge 368 with an open top 356. The open top 356 opens to the socket 354. The spar 336 extends along a centerline axis 350. The spar 336 extends through the open top 356 and into the socket 354. The spar 336 contacts the upper edge 368 at a junction 358.

The airfoil assembly 330, like the airfoil assemblies 130, 230, includes a stress relief 360 formed at the junction 358. The stress relief 360, like the stress relief 260 (FIG. 5), includes a groove 361 with an insert 370 provided within the groove 361. The insert 370, however, is formed to fit only in the groove 361 unlike the insert 270 (FIG. 5).

The insert 370 can include any suitable material. As a non-limiting example, the insert 370 can include a compressible material. As a non-limiting example, the insert 370 can include precured elastomeric material. The insert 370 can be used to dampen the movement of the spar 336 and urge the spar 336 back to its original position.

Figure 7:
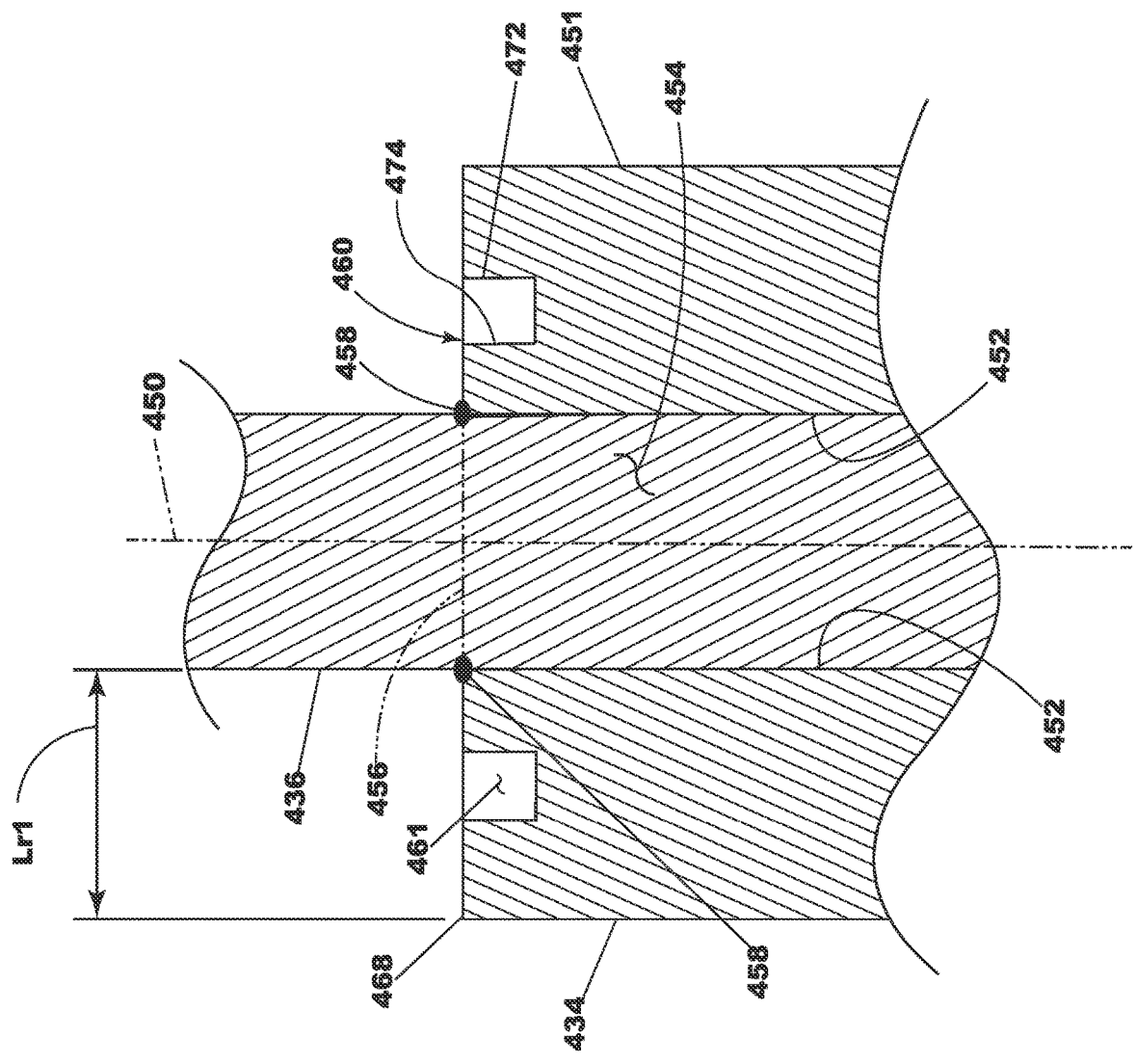
FIG. 7 is a schematic cross-sectional view of a portion of an exemplary airfoil assembly suitable for use as the airfoil assembly of FIG. 2, the airfoil assembly comprising a stress relief including a groove and a tooth.

FIG. 7 is a schematic cross-sectional view of a portion of an exemplary airfoil assembly 430 suitable for use as the airfoil assembly 130 of FIG. 2. The airfoil assembly 430 is similar to the airfoil assemblies 130 (FIGS. 3 and 4), 230 (FIG. 5), 330 (FIG. 6), therefore, like parts will be identified with like numerals increased to the 400 series, with it being understood that the description of the airfoil assembly 130, 230, 330 applies to the airfoil assembly 430 unless noted otherwise.

The airfoil assembly 430 includes a trunnion 434 and a spar 436. The trunnion 434 includes a wall 451 having a set of interior surfaces 452 defining a socket 454. The trunnion 434 includes an upper edge 468 with an open top 456. The open top 456 opens to the socket 454. The spar 436 extends along a centerline axis 450. The spar 436 extends through the open top 456 and into the socket 454. The spar 436 contacts the upper edge 468 at a junction 458.

The airfoil assembly 430, like the airfoil assemblies 130, 230, 330, includes a stress relief 460 formed at the junction 458. The stress relief 460, like the stress reliefs 160 (FIG. 4), 260 (FIG. 5), 360 (FIG. 6), includes a groove 461. The groove 461, however, is spaced from the spar 436 such that the stress relief 460 includes a tooth 474 between the spar 436 or the socket 454 and the groove 461. As a non-limiting example, the groove 461 can be radially spaced from the socket 454. The tooth 474 is formed at the junction 458. The tooth 474 can be sized such that the groove 461 is radially spaced from the spar 436 at any suitable distance. As a non-limiting example, the tooth 474 can be sized such that a radially nearest portion of the groove 461 to the spar 436 is provided between greater than 0% and less than or equal to 50% of a total radial length (Lr1) of the upper edge 468 on each radial half of the upper edge 468. As a non-limiting example, the tooth 474 can be sized such that a radially nearest portion of the groove 461 to the spar 436 is provided between greater than or equal to 5% and less than or equal to 50% of a total radial length (Lr1) of the upper edge 468 on each radial half of the upper edge 468. As a non-limiting example, the tooth 474 can be sized such that a radially nearest portion of the groove 461 to the spar 436 is provided between greater than or equal to 2% and less than or equal to 30% of a total radial length (Lr1) of the upper edge 468 on each radial half of the upper edge 468.

The tooth 474 can be a portion of the trunnion 434. Alternatively, the tooth 474 can be separately formed from the trunnion 434 or otherwise include a differing material with respect to a material of the trunnion 434.

The groove 461 can define a void or absence of material within the trunnion 434. It will be appreciated that a material can be provided within the groove 461 such as the insert 370 (FIG. 6).

During operation, the tooth 474 can flex due to the movement of the spar from the external force (F) (FIG. 4). The tooth 474 can flex with the spar 436 and into a respective portion of the groove 461. The tooth 474, like the insert 270 (FIG. 5) can act as a damper that slows down or limits the movement of the spar 436.

Figure 8:
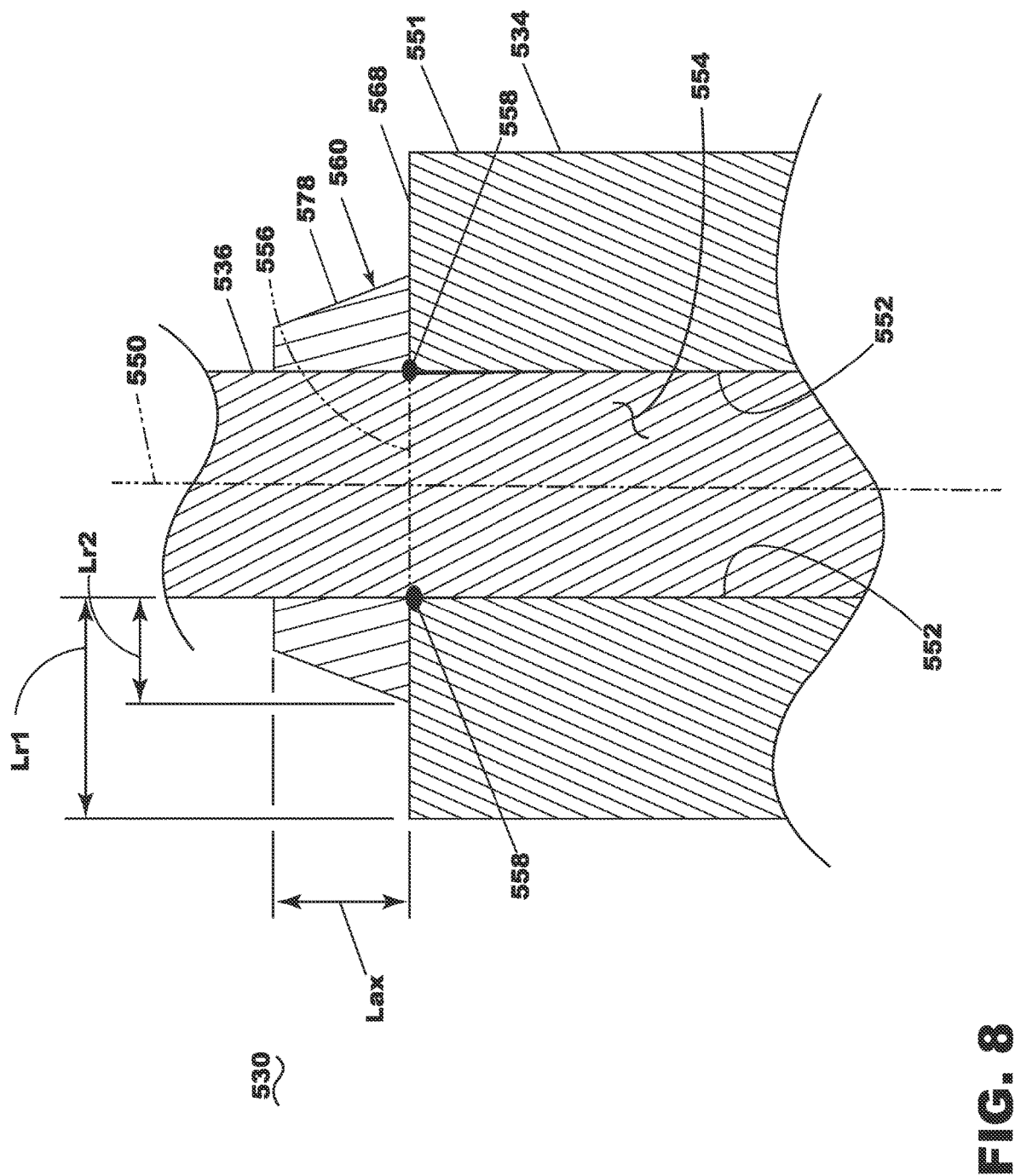
FIG. 8 is a schematic cross-sectional view of a portion of an exemplary airfoil assembly suitable for use as the airfoil assembly of FIG. 2, the airfoil assembly comprising a stress relief including a finger.

FIG. 8 is a schematic cross-sectional view of a portion of an exemplary airfoil assembly 530 suitable for use as the airfoil assembly 130 of FIG. 2. The airfoil assembly 530 is similar to the airfoil assemblies 130 (FIG. 4), 230 (FIG. 5), 330 (FIG. 6), 430 (FIG. 7), therefore, like parts will be identified with like numerals increased to the 500 series, with it being understood that the description of the airfoil assembly 130, 230, 330, 430 applies to the airfoil assembly 530 unless noted otherwise.

The airfoil assembly 530 includes a trunnion 534 and a spar 536. The trunnion 534 includes a wall 551 having a set of interior surfaces 552 defining a socket 554. The trunnion 534 includes an upper edge 568 with an open top 556. The open top 556 opens to the socket 554. The spar 536 extends along a centerline axis 550. The spar 536 extends through the open top 556 and into the socket 554. The spar 536 contacts the upper edge 568 at a junction 558.

The airfoil assembly 530, like the airfoil assemblies 130, 230, 330, 430, includes a stress relief 560 formed at the junction 558. The stress relief 560, however, extends from the upper edge 568. The stress relief 560 includes a finger 578 that extends along a portion of the spar 536 beyond the open top 556 of the trunnion 534.

The finger 578 can have a trapezoidal cross section when viewed along a plane extending along the centerline axis. It will be appreciated, however, that the finger 578 can have any suitable cross section.

The upper edge 568 can extend a first radial length (Lr1) with respect to the centerline axis 550. The first radial length (Lr1) is defined as the total radial width that the upper edge extends on a single radial half of the centerline axis 550. The stress relief 560 can extend a second radial length (Lr2) with respect to the centerline axis 550. The second radial length (Lr2) is defined as a maximum radial width that the stress relief 560 extends on a single radial half of the centerline axis 550. The second radial length (Lr2) can be smaller than the first radial length (Lr1). The second radial length (Lr2) can be greater than 0% and less than or equal to 50% of the first radial length (Lr1). As a non-limiting example, the second radial length (Lr2) can be greater than or equal to 5% and less than or equal to 50% of the first radial length (Lr1). As a non-limiting example, the second radial length (Lr2) can be greater than or equal to 10% and less than or equal to 30% of the first radial length (Lr1)

The stress relief 560 can extend an axial length (Lax) with respect to the centerline axis 550. The axial length (Lax) is defined as the maximum axial width that the stress relief 560 extends in the axial direction. The axial length (Lax) can be greater than or equal to the second radial length (Lr2) and less than or equal to the first radial length (Lr1).

The stress relief 560 can be integrally formed with or provided along the upper edge 568. The stress relief 560 can include the same or differing material from the trunnion 534 or the spar 536.

During operation, the finger 578, like the tooth 474 (FIG. 7) can at least partially move with the spar 536. The finger 578 can act as a damper and tailor the stiffness of the spar 536.

Figure 9:
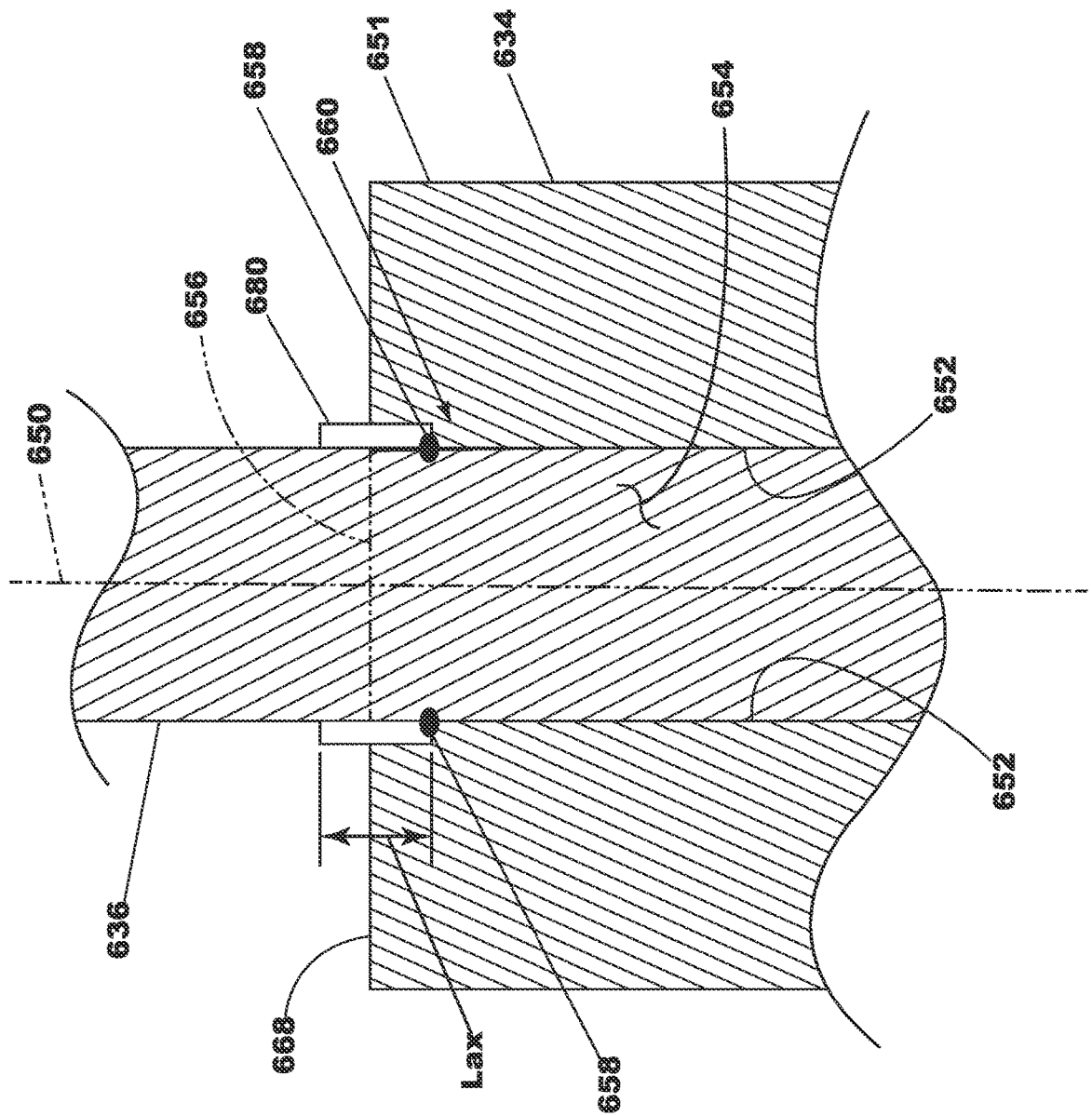
FIG. 9 is a schematic cross-sectional view of a portion of an exemplary airfoil assembly suitable for use as the airfoil assembly of FIG. 2, the airfoil assembly comprising a stress relief including skin overlaying a portion of the spar.

FIG. 9 is a schematic cross-sectional view of a portion of an exemplary airfoil assembly 630 suitable for use as the airfoil assembly 130 of FIG. 2. The airfoil assembly 630 is similar to the airfoil assemblies 130 (FIGS. 3 and 4), 230 (FIG. 5), 330 (FIG. 6), 430 (FIG. 7), 530 (FIG. 8), therefore, like parts will be identified with like numerals increased to the 600 series, with it being understood that the description of the airfoil assembly 130, 230, 330, 430, 530 applies to the airfoil assembly 630 unless noted otherwise.

The airfoil assembly 630 includes a trunnion 634 and a spar 636. The trunnion 634 includes a wall 651 having a set of interior surfaces 652 defining a socket 654. The trunnion 634 includes an upper edge 668 with an open top 656. The open top 656 opens to the socket 654. The spar 636 extends along a centerline axis 650. The spar 636 extends through the open top 656 and into the socket 654. The spar 636 contacts the upper edge 668 at a junction 658.

The airfoil assembly 630, like the airfoil assemblies 130, 230, 330, 430, 530, includes a stress relief 660 formed at the junction 658. The stress relief 660, however, is formed as a skin 680 that overlies at least a respective portion of the spar 636.

The skin 680 can extend an axial distance (Lax) along the centerline axis 650. The centerline axis 650 can extend a total axial length. It is contemplated that the skin 680 can extend greater than or equal to 5% and less than or equal to 10% of the total axial length. It is contemplated that the skin 680 can extend beyond the open top 656 greater than or equal to 5% of the total axial length.

It is contemplated that the skin 680 can form a portion of the airfoil (e.g., the airfoil 132 of FIG. 2) such that the skin 680 extends from the airfoil and into the trunnion 634. As a non-limiting example, the airfoil can include a composite skin that at least partially defines the skin 680. The composite skin of the airfoil can define at least a portion of the outer wall of the airfoil (e.g., the outer wall 138 of FIG. 2).

The skin 680 can be a shim that is provided between the spar 636 and the trunnion 634. The shim can be a metallic shim. The skin 680 can be a composite material that is braided or woven over a respective portion of the spar 636.

While the skin 680 is shown to have a thickness that extends into the trunnion 634, it will be appreciated that the skin 680 can lay flat against the spar 636 and be provided between the set of interior surfaces 652 and the spar 636. The skin 680 can be sized such that a groove (e.g., the groove 161 of FIG. 3, the groove 261 of FIG. 5, the groove 361 of FIG. 6 or the groove 461 of FIG. 7) can be excluded from the trunnion 634. As such, the skin 680, as illustrated, includes an exaggerated dimension for illustrative purposes.

While illustrated as having rectangular cross section when viewed along a plane extending along the centerline axis 650, it will be appreciated that the skin 680 can have any suitable cross section. As a non-limiting example, the skin 680 can include a tapered section or have a constant thickness.

The stress relief 660, compared to the stress relief 160 (FIG. 4), 260 (FIG. 5), 360 (FIG. 6), 460 (FIG. 7), 560 (FIG. 8), can be defined as a relatively inexpensive and simple method of tailoring the stresses and stiffness of the airfoil assembly 630. For example, the stress reliefs 160, 260, 360, 460, 560 can require additional machining or parts to be coupled to or formed with the trunnion 634. The stress relief 660, however, can be provided between the spar 636 and the trunnion 634 or otherwise formed over a respective portion of the spar 636 and does not require additional coupling to retain the stress relief 660.

Benefits associated with the present disclosure include an airfoil assembly with a relatively non-complex formation when compared to a conventional airfoil assembly. For example, the conventional airfoil assembly with a spar and a trunnion requires additional structure to ensure that the airfoil of the conventional airfoil assembly is coupled to the trunnion. For example, the conventional airfoil assembly can require a physical connection or mechanical connection between the spar and the trunnion. The additional structures of the trunnion and the spar result in a point stress being created at a junction between the trunnion and the spar. This point stress can damage the spar when the spar flexes due to external forces. The airfoil assembly, as described herein, however, includes the stress relief that distributes the stresses that would otherwise form the point stress along the spar. This, in turn, reduces the stresses that a single portion of the spar experiences, ultimately increasing the lifespan of the airfoil assembly and reducing the possibility of damage when compared to the conventional airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a fan section, a compressor section, a combustion section, and a turbine section in serial flow arrangement, and an airfoil assembly provided within one of the fan section, the compressor section, the combustion section, or the turbine section, the airfoil assembly comprising an airfoil defining an interior, a spar having a portion located within the interior, a trunnion having an upper edge with an open top, and a wall having a set of interior surfaces defining a socket extending from the open top, the spar extending through the open top and into the socket, with a junction being formed between the spar and a portion of the upper edge defining the open top, and a stress relief located at the junction.

An airfoil assembly for a turbine engine, the airfoil assembly comprising an airfoil defining an interior, a spar having a portion located within the interior, a trunnion having an upper edge with an open top, and a wall having a set of interior surfaces defining a socket extending from the open top, the spar extending through the open top and into the socket, with a junction being formed between the spar and a portion of the upper edge defining the open top, and a stress relief located at the junction.

An airfoil assembly comprising a spar, a trunnion having an upper edge with an open top, and a wall having a set of interior surfaces defining a socket extending from the open top, the spar extending through the open top and into the socket, with a junction being formed between the spar and a portion of the upper edge defining the open top, and a stress relief located at the junction.

An airfoil assembly comprising a composite spar, a metallic trunnion having an upper edge with an open top, and a wall having a set of interior surfaces defining a socket extending from the open top, the composite spar extending through the open top and into the socket, with a junction being formed between the composite spar and a portion of the upper edge defining the open top, and a stress relief located at the junction.

The turbine engine of any preceding clause, wherein the stress relief is at least partially defined by a groove along a portion of the upper edge.

The turbine engine of any preceding clause, wherein the groove defines a portion of the socket.

The turbine engine of any preceding clause, wherein the groove includes a first leg and a second leg, non-parallel to the first leg.

The turbine engine of any preceding clause, wherein the spar includes a centerline axis, and the first leg extends at a first angle, with respect to the centerline axis, and the second leg extends at a second angle, with respect to the centerline axis, with the first angle being less than the second angle.

The turbine engine of any preceding clause, wherein the first angle has an absolute value of greater than or equal to 0.1 degrees and less than or equal to 10 degrees.

The turbine engine of any preceding clause, wherein the second angle has an absolute value of greater than or equal to 0.1 degrees and less than or equal to 15 degrees.

The turbine engine of any preceding clause, wherein the first leg extends between the junction and the second leg.

The turbine engine of any preceding clause, wherein the stress relief further comprises an insert positioned within the groove.

The turbine engine of any preceding clause, wherein the insert is a bushing including a collar extending radially outward from the spar.

The turbine engine of any preceding clause, wherein the stress relief further comprises a compressible insert receivable within the groove.

The turbine engine of any preceding clause, wherein the spar includes a centerline axis and the groove includes a rectangular cross section when viewed along a plane extending along the centerline axis.

The turbine engine of any preceding clause, wherein the stress relief includes a tooth and a groove, with the tooth being provided at the junction and the groove being spaced from the socket.

The turbine engine of any preceding clause, wherein the stress relief is a finger extending from the upper edge and along a portion of the spar.

The turbine engine of any preceding clause, wherein the stress relief is a skin overlaying a respective portion of the spar, the skin being in the form of one of a shim including a composite material or a metallic material, or a precured composite skin.

The turbine engine of any preceding clause, wherein the spar extends a total axial length along a centerline axis and the stress relief extends axially along greater than or equal to 5% and less than or equal to 10% of the total axial length.

The turbine engine of any preceding clause, wherein the spar includes a composite material and the trunnion includes a metallic material.

The turbine engine of any preceding clause, wherein the airfoil assembly is provided within a fan section of the turbine engine.

The turbine engine of any preceding clause, wherein the stress relief is at least partially defined by a groove formed along the upper edge.

The turbine engine of any preceding clause, wherein the stress relief is one of or a combination of a groove formed in the trunnion adjacent the spar, a tooth formed adjacent the spar by a groove spaced radially from the spar, an extension above the spar along a portion of the spar, an insert positioned in the trunnion, or a skin overlying the spar at least partially between the trunnion and the spar.

The turbine engine of any preceding clause, wherein spar includes a centerline axis and the upper edge extends a first radial length, with respect to the centerline axis.

The turbine engine of any preceding clause, wherein the stress relief extends a second radial length and an axial length, with respect to the centerline axis.

The turbine engine of any preceding clause, wherein the second radial length is greater than 0% and less than or equal to 50% of the first radial length.

The turbine engine of any preceding clause, wherein the second radial length is greater than or equal to 5% and less than or equal to 50% of the first radial length.

The turbine engine of any preceding clause, wherein the second radial length is greater than or equal to 2% and less than or equal to 30% of the first radial length.

The turbine engine of any preceding clause, wherein the second radial length is greater than or equal to 5% and less than or equal to 50% of the first radial length.

The turbine engine of any preceding clause, wherein the second radial length is greater than or equal to 10% and less than or equal to 30% of the first radial length.

The turbine engine of any preceding clause, wherein the axial length is greater than or equal to the second radial length.

The turbine engine of any preceding clause, wherein the axial length is less than or equal to the first radial length.

The turbine engine of any preceding clause, wherein the stress relief includes a trapezoidal cross-section area when viewed along a plane extending along the centerline axis.

The turbine engine of any preceding clause, wherein the stress relief slopes radially inward towards the centerline axis from the upper edge.

What is claimed is:

1. A turbine engine comprising:
   a fan section, a compressor section, a combustion section, and a turbine section in serial flow arrangement; and
   an airfoil assembly provided within one of the fan section, the compressor section, the combustion section, or the turbine section, the airfoil assembly comprising:
   an airfoil extending between a root and a tip, the airfoil defining an interior;
   a spar having a first portion located within the interior of the airfoil and a second portion extending from the root of the airfoil;
   a trunnion having an upper edge with an open top, and a wall having a set of interior surfaces defining a socket extending from the open top, the second portion of the spar extending through the open top and into the socket, with a junction being formed between the spar and a portion of the upper edge defining the open top, the trunnion configured to rotate about a pitch axis in a rotational direction such that rotation of the trunnion rotates the spar and the airfoil about the pitch axis; and
   a stress relief located at the junction.

2. The turbine engine of claim 1, wherein the stress relief is at least partially defined by a groove along a portion of the upper edge.

3. The turbine engine of claim 2, wherein the groove defines a portion of the socket.

4. The turbine engine of claim 2, wherein the groove includes a first leg and a second leg, non-parallel to the first leg.

5. The turbine engine of claim 4, wherein the first leg extends between the junction and the second leg.

6. The turbine engine of claim 2, wherein the stress relief further comprises an insert positioned within the groove.

7. The turbine engine of claim 6, wherein the insert is a bushing including a collar extending radially outward from the spar.

8. The turbine engine of claim 2, wherein the stress relief further comprises a compressible insert receivable within the groove.

9. The turbine engine of claim 2, wherein the spar includes a centerline axis and the groove includes a rectangular cross section when viewed along a plane extending along the centerline axis.

10. The turbine engine of claim 1, wherein the stress relief includes a tooth and a groove, with the tooth being provided at the junction and the groove being spaced from the socket.

11. The turbine engine of claim 1, wherein the stress relief is a finger extending from the upper edge and along a portion of the spar.

12. The turbine engine of claim 1, wherein the stress relief is a skin overlaying a respective portion of the spar, the skin being in the form of one of:
   a shim including a composite material or a metallic material; or
   a precured composite skin.

13. The turbine engine of claim 1, wherein the spar extends a total axial length along a centerline axis and the stress relief extends axially along greater than or equal to 5% and less than or equal to 10% of the total axial length.

14. The turbine engine of claim 1, wherein the spar includes a composite material and the trunnion includes a metallic material.

15. An airfoil assembly comprising:
   a wall extending between a root and a tip;
   an interior,
   a spar having a first portion located within the interior and a second portion extending beyond the interior at the root;
   a trunnion having an upper edge with an open top, and a wall having a set of interior surfaces defining a socket extending from the open top, the second portion of the spar extending through the open top and into the socket, with a junction being formed between the spar and a portion of the upper edge defining the open top, the trunnion configured to rotate about a pitch axis in a rotational direction such that rotation of the trunnion rotates the spar and a respective portion of the airfoil assembly about the pitch axis; and
   a stress relief located at the junction.

16. The airfoil assembly of claim 15, wherein the stress relief is at least partially defined by a groove formed along the upper edge.

17. The airfoil assembly of claim 15, wherein the stress relief is one of or a combination of a groove formed in the trunnion adjacent the spar, a tooth formed adjacent the spar by a groove spaced radially from the spar, an extension above the spar along a portion of the spar, an insert positioned in the trunnion, or a skin overlying the spar at least partially between the trunnion and the spar.

18. A turbine engine comprising:
   a fan section, a compressor section, a combustion section, and a turbine section in serial flow arrangement; and
   an airfoil assembly provided within one of the fan section, the compressor section, the combustion section, or the turbine section, the airfoil assembly comprising:
   an airfoil defining an interior;
   a spar having a portion located within the interior, the spar having a centerline axis;
   a trunnion having an upper edge with an open top, and a wall having a set of interior surfaces defining a socket extending from the open top, the spar extending through the open top and into the socket, with a junction being formed between the spar and a portion of the upper edge defining the open top; and
   a stress relief located at the junction, wherein the stress relief is at least partially defined by a groove along a portion of the upper edge, wherein the groove includes a first leg and a second leg, non-parallel to the first leg, and wherein the first leg extends at a first angle, with respect to the centerline axis and the second leg extends at a second angle, with respect to the centerline axis, with the first angle being less than the second angle.

19. The turbine engine of claim 18, wherein the first angle has an absolute value of greater than or equal to 0.1 degrees and less than or equal to 10 degrees.

20. The turbine engine of claim 18, wherein the second angle has an absolute value of greater than or equal to 0.1 degrees and less than or equal to 15 degrees.

* * * * *